United States Patent
Inoue et al.

(10) Patent No.: US 11,146,096 B2
(45) Date of Patent: Oct. 12, 2021

(54) CONTROL METHOD OF POWER SUPPLY APPARATUS, THE POWER SUPPLY APPARATUS, AND POWER SUPPLY SYSTEM

(71) Applicant: KYOCERA Corporation, Kyoto (JP)

(72) Inventors: Hirokazu Inoue, Yamato (JP); Masahiro Baba, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 496 days.

(21) Appl. No.: 15/561,283

(22) PCT Filed: Mar. 25, 2016

(86) PCT No.: PCT/JP2016/001769
§ 371 (c)(1),
(2) Date: Sep. 25, 2017

(87) PCT Pub. No.: WO2016/157874
PCT Pub. Date: Oct. 6, 2016

(65) Prior Publication Data
US 2018/0123508 A1    May 3, 2018

(30) Foreign Application Priority Data
Mar. 27, 2015    (JP) .............................. JP2015-067521

(51) Int. Cl.
*H02J 7/34*    (2006.01)
*H02M 3/158*    (2006.01)
(Continued)

(52) U.S. Cl.
CPC .............. *H02J 7/345* (2013.01); *H02J 3/383* (2013.01); *H02J 7/35* (2013.01); *H02M 3/158* (2013.01); *H02M 7/68* (2013.01)

(58) Field of Classification Search
CPC .. H02J 7/345; H02J 7/35; H02J 3/383; H02M 3/158; H02M 7/68
See application file for complete search history.

(56) References Cited

U.S. PATENT DOCUMENTS

| 9,077,202 B1* | 7/2015 | Baker ...................... H02J 1/102 |
| 2008/0150484 A1* | 6/2008 | Kimball .................. H02J 7/345 |
| | | 320/125 |

(Continued)

FOREIGN PATENT DOCUMENTS

| JP | H9-233831 A | 9/1997 |
| JP | 2013-42627 A | 2/2013 |

(Continued)

OTHER PUBLICATIONS

International Search Report dated Jun. 14, 2016, issued by Japan Patent Office for International Application No. PCT/JP2016/001769.

(Continued)

*Primary Examiner* — Jue Zhang
(74) *Attorney, Agent, or Firm* — Procopio, Cory, Hargreaves & Savitch LLP

(57) ABSTRACT

The disclosure reduces the occurrence of an inrush current upon electrical connection of a storage cell, allowing immediate use. A power supply apparatus is configured to convert DC power from a solar cell and a storage cell into AC power and includes: a first capacitor disposed between the solar cell and the storage cell; and a controller configured to charge the first capacitor with power from the solar cell or a power grid and, after a first voltage of the first capacitor exceeds a second voltage of the storage cell, to electrically connect the storage cell with the first capacitor.

7 Claims, 4 Drawing Sheets

(51) Int. Cl.
  *H02J 3/38* (2006.01)
  *H02J 7/35* (2006.01)
  *H02M 7/68* (2006.01)

(56) References Cited

U.S. PATENT DOCUMENTS

| | | | | |
|---|---|---|---|---|
| 2014/0132226 A1* | 5/2014 | Sakamoto | ............... | H02J 7/007 320/166 |
| 2014/0210275 A1* | 7/2014 | Gong | ............... | H02J 3/383 307/82 |
| 2015/0149799 A1* | 5/2015 | Ye | ............... | H02J 7/345 713/320 |
| 2015/0185291 A1* | 7/2015 | Dao | ............... | H04Q 9/00 324/434 |
| 2015/0213709 A1* | 7/2015 | Miller | ............... | G06Q 10/0833 340/693.2 |
| 2017/0179739 A1* | 6/2017 | Webb | ............... | H02J 7/345 |

FOREIGN PATENT DOCUMENTS

| | | |
|---|---|---|
| JP | 2013-179760 A | 9/2013 |
| JP | 2014-30299 A | 2/2014 |
| JP | 2014-220152 A | 11/2014 |

OTHER PUBLICATIONS

Written Opinion of International Searching Authority dated Jun. 14, 2016 issued by Japan Patent Office for International Application No. PCT/JP2016/001769.

* cited by examiner

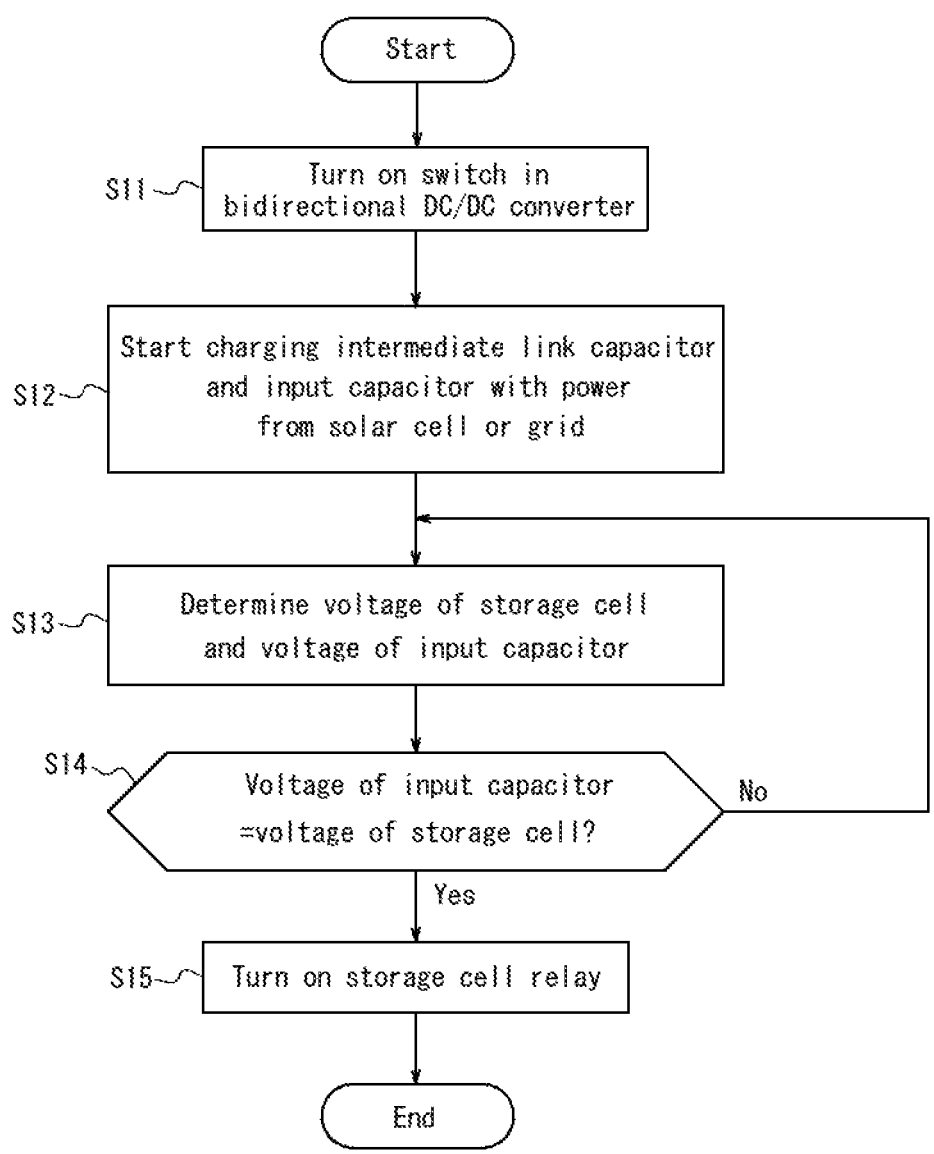

CONTROL METHOD OF POWER SUPPLY APPARATUS, THE POWER SUPPLY APPARATUS, AND POWER SUPPLY SYSTEM

CROSS REFERENCE TO RELATED APPLICATION

This application is a national stage application based on PCT Application No. PCT/JP2016/001769 filed on Mar. 25, 2016, which claims priority to and the benefit of Japanese Patent Application No. 2015-067521 (filed on Mar. 27, 2015), the entire contents of which are incorporated herein by reference.

TECHNICAL FIELD

The disclosure relates to a control method of a power supply apparatus, the power supply apparatus, and a power supply system.

BACKGROUND

There is conventionally known a power supply apparatus configured to convert DC power from a solar cell and a rechargeable storage cell into AC power. For safety purposes, such a power supply apparatus is provided with a relay (hereinafter, referred to as a "storage cell relay") between the storage cell and the power supply apparatus. In such a conventional power supply apparatus, when the storage cell relay is turned on to charge or discharge the storage cell, a large current (an inrush current) may flow from the storage cell to a capacitor and so on provided to a circuit within the power supply apparatus.

As a method of reducing the inrush current, for example, patent literature PLT1 set forth below discloses, in order to reduce the inrush current at the start of a power generation operation of a fuel cell in a power generation apparatus, boosting a DC link by using the storage cell prior to the start of the power generation operation of the fuel cell.

CITATION LIST

Patent Literature

PLT 1: JP-A-2014-220152

SUMMARY

A power supply apparatus according to one embodiment is configured to convert DC power from a solar cell and a storage cell into AC power. The power supply apparatus includes a first capacitor and a controller. The first capacitor is disposed between the solar cell and the storage cell. The controller is configured to charge the first capacitor with the power from the solar cell or a power grid and, after a first voltage of the first capacitor exceeds a second voltage of the storage cell, to electrically connect the storage cell with the first capacitor.

Also, a power supply system according to one embodiment includes a power supply apparatus, a storage cell, and a solar cell. The power supply apparatus is configured to convert DC power from the solar cell and the storage cell into AC power. The power supply apparatus includes a first capacitor and a controller. The first capacitor is disposed between the solar cell and the storage cell. The controller is configured to charge the first capacitor with the power from the solar cell or a power grid and, after a first voltage of the first capacitor exceeds a second voltage of the storage cell, to electrically connect the storage cell with the first capacitor.

Further, a control method of a power supply apparatus according to one embodiment includes charging a first capacitor with a power from a solar cell or a power grid. The control method includes, after a first voltage of the first capacitor exceeds a second voltage of a storage cell, electrically connecting the storage cell with the first capacitor.

BRIEF DESCRIPTION OF THE DRAWINGS

In the accompanying drawings:

FIG. 4 is a flowchart illustrating a control method according to the second embodiment.

DETAILED DESCRIPTION

Hereinafter, embodiments of the disclosure will be described in detail with reference to the accompanying drawings.

First Embodiment

Figure 1:
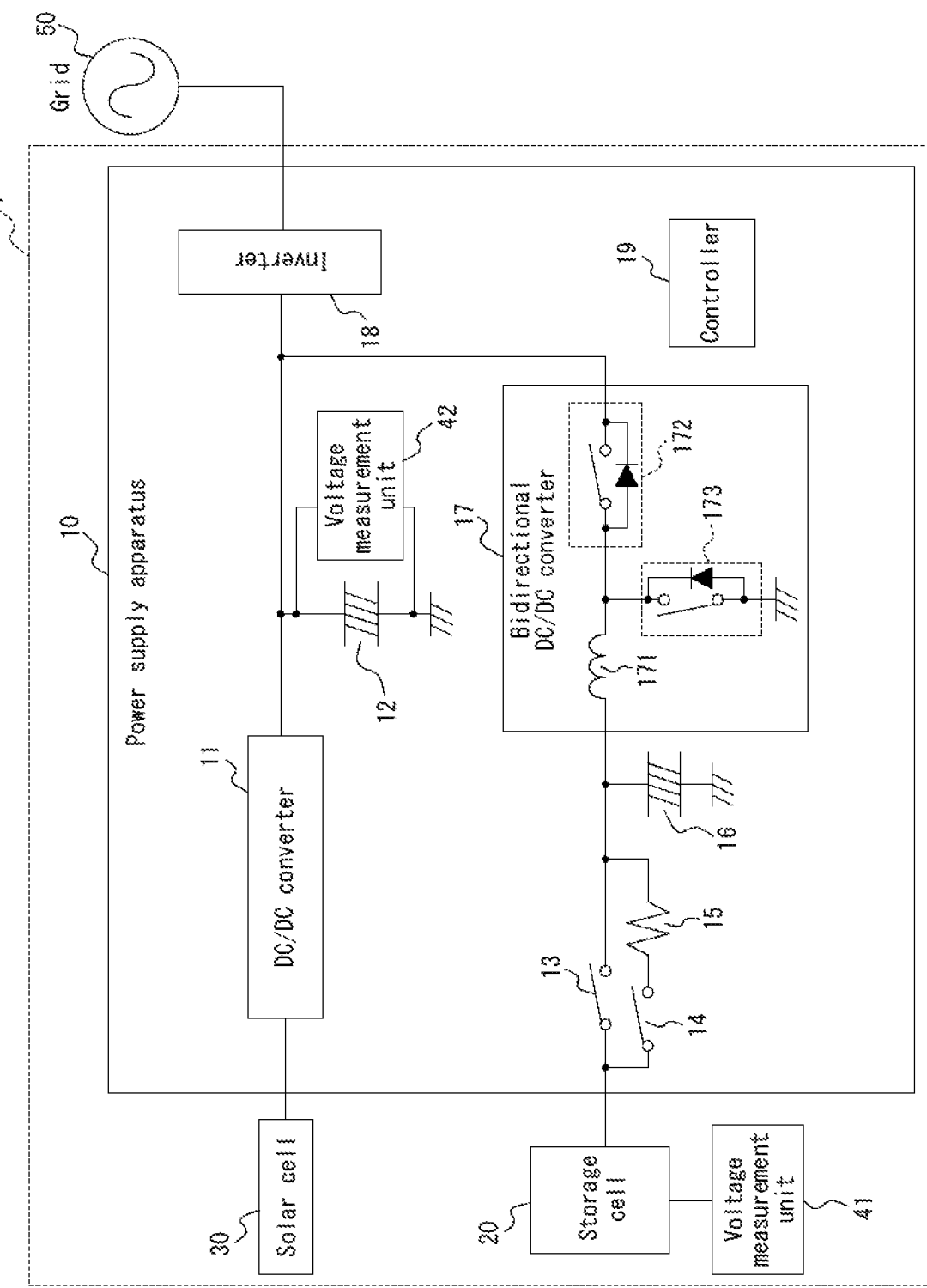
FIG. 1 is a block diagram of a power supply system according to a first embodiment.

A power supply system 1 according to a first embodiment includes, as illustrated in FIG. 1, a power supply apparatus 10 and a storage cell 20 and a solar cell 30 that are serving as distributed power sources. According to the present embodiment, as an example and not by way of limitation, the storage cell 20 and the solar cell 30 are each coupled to the power supply apparatus 10 in a manner capable of allowing current flow. However, any number of distributed power sources may be provided.

In FIG. 1, solid lines connecting functional blocks together represent wiring to flow power. Control signals or communication information flowing between a controller 19 and a number of functional blocks are omitted for clarity in FIG. 1. Principal control signals and the like will be discussed later. The control signals and the communication information may be communicated through either a wired communication or a radio communication. For the communication of the control signals and the communication information, also, various schemes may be employed in each layer. For example, a short distance communication scheme such as ZigBee® (ZigBee is a registered trademark in Japan, other countries, or both) may be employed. Further, various transmission medium including an infrared communication and a power line communication (PLC) may be used. On low layers including physical layers appropriate for each communication, a communication protocol such as ZigBee SEP2.0 (Smart Energy Profile 2.0), ECHONET Lite® (ECHONET Lite is a registered trademark in Japan, other countries, or both) which define a logical layer alone may be operated.

The power supply apparatus 10 is configured with, for example, a power conditioner and converts DC power supplied from the solar cell 30 and the storage cell 20 and AC power supplied from a power grid 50. The power supply apparatus 10 includes a DC/DC converter 11, a first capacitor 12, a first relay 13, a second relay 14, a resistor 15, a second capacitor 16, a bidirectional DC/DC converter 17, an inverter 18, and the controller 19.

The DC/DC converter 11 boosts DC voltage of power input from the solar cell 30 to, for example, DC voltage within a range of a rated voltage of the inverter 18. Also, the DC/DC converter 11 includes a switch to electrically connect or disconnect between the solar cell 30 and the power supply apparatus 10. That is, when the switch in the DC/DC converter 11 is turned on, the solar cell 30 and the power supply apparatus 10 are electrically connected with each other, and when the switch is turned off, the solar cell 30 and the power supply apparatus 10 are electrically disconnected from each other. When a plurality of solar cells 30 are coupled to the power supply apparatus 10 in the manner capable of allowing current flow, as many DC/DC converters 11 as the solar cells 30 are also provided. In this case, the DC/DC converters 11 electrically connected with the plurality of solar cells 30 may boost the DC voltage of power input from the respective solar cells 30 into the DC voltage within the range of the rated voltage of the inverter 18.

The first capacitor 12 serves as an intermediate link capacitor and is configured with, for example, an electrolytic capacitor to store charge. The first capacitor 12 is disposed between the solar cell 30 and the storage cell 20. A voltage measurement unit 42 is connected in parallel with the first capacitor 12 at either end of the first capacitor 12. The voltage measurement unit 42 detects a voltage applied to the first capacitor 12, which is then notified to the controller 19.

The first relay 13 is a switch to open or close an electrical path by switching off (an opening state) or switching on (a closing state). The first relay 13 is disposed between the first capacitor 12 and the storage cell 20 and opens or closes an electrical path between the first capacitor 12 and the storage cell 20. The second relay 14 is another switch to open or close an electrical path by switching off (the opening state) or switching on (the closing state). The resistor 15 is configured to reduce an inrush current. The second relay 14 and the resistor 15 are connected in series with each other and disposed between the first capacitor 12 and the storage cell 20. The first relay 13 is connected in parallel with the second relay 14 and the resistor 15 and switches on or off an electrical connection between the storage cell 20 and the power supply apparatus 10. That is, when both the first relay 13 and the second relay 14 are off, the storage cell 20 and the power supply apparatus 10 are electrically disconnected. When any one of the first relay 13 and the second relay 14 is on and the other is off, the storage cell 20 and the power supply apparatus 10 are electrically connected with each other through the one of the relays that is on. When both the first relay 13 and the second relay 14 are on, the storage cell 20 and the power supply apparatus 10 are electrically connected with each other through both of the relays. When both the first relay 13 and the second relay 14 are on, due to the resistor 15 connected with the second relay 14, most of the currents flow through the first relay 13.

The second capacitor 16 serves as an input capacitor and is configured with an electrolytic capacitor to store charge. The second capacitor 16 is disposed between the first capacitor 12 and the storage cell 20 to be electrically connected with the first capacitor 12 through the bidirectional DC/DC converter 17.

The bidirectional DC/DC converter 17 boosts the DC voltage of the power input from the storage cell 20 to, for example, the DC voltage within the range of the rated voltage of the inverter 18. Also, the bidirectional DC/DC converter 17 steps down the DC voltage of the power from the solar cell 30 boosted by the DC/DC converter 11 and input to the bidirectional DC/DC converter 17, and also the DC voltage of the power from the power grid 50 subjected to AC/DC conversion by the inverter 18 and input to the bidirectional DC/DC converter 17 to, for example, the DC voltage within a range of a rated voltage of the storage cell 20.

The bidirectional DC/DC converter 17 includes a DC reactor 171, a switch 172, and a switch 173. The DC reactor 171 is configured to reduce harmonics. The switch 172 is configured with a switching element and a diode connected in parallel with each other. When the switching element is off, that is, when the switch 172 is off, an electric current flows only in a direction from the storage cell 20. When the switching element is on, that is, when the switch 172 is on, the electric current flows in both directions.

The inverter 18 is configured with a bidirectional inverter and converts the DC power input from the storage cell 20 and the solar cell 30 into the AC power. Also, the inverter 18 converts the AC power input from the power grid 50 into the DC power.

The controller 19 is configured with a microcomputer or the like provided with, for example, a nonvolatile memory and a processor to execute a control program stored in the nonvolatile memory. The controller 19, based on conditions such as an increase in a power grid voltage and power outage, controls operations of the DC/DC converter 11, the first relay 13, the second relay 14, and the bidirectional DC/DC converter 17. Also, the controller 19 receives data of voltages from the voltage measurement units 41 and 42 and controls the elements based on the data in a manner discussed later. The controller 19 further controls an operation of a power grid switch (not illustrated) to turn on or off an electric connection between the power grid 50 and the inverter 18.

The storage cell 20 is configured with, for example, a lithium-ion battery or a nickel hydrogen battery. The storage cell 20 is capable of supplying power by discharging power stored therein. The storage cell 20 is also capable of storing the power supplied from the power grid 50 or the solar cell 30. The voltage measurement unit 41 is connected in parallel with the storage cell 20 at either pole of the storage cell 20. The voltage measurement unit 41 detects a voltage of the storage cell 20, which is then notified to the controller 19.

The solar cell 30 converts energy of the sunlight into the DC power. The solar cell 30 is configured with, for example, power generation units including photoelectric conversion cells coupled in a matrix in the manner capable of allowing current flow and configured to output a predetermined short-circuit current (e.g., 10 [A]). The solar cell 30 may be any solar cell capable of performing photoelectric conversion, such as a silicon-based polycrystalline solar cell, a silicon-based monocrystalline solar cell, and a thin-film type solar cell such as CIGS.

Figure 2:
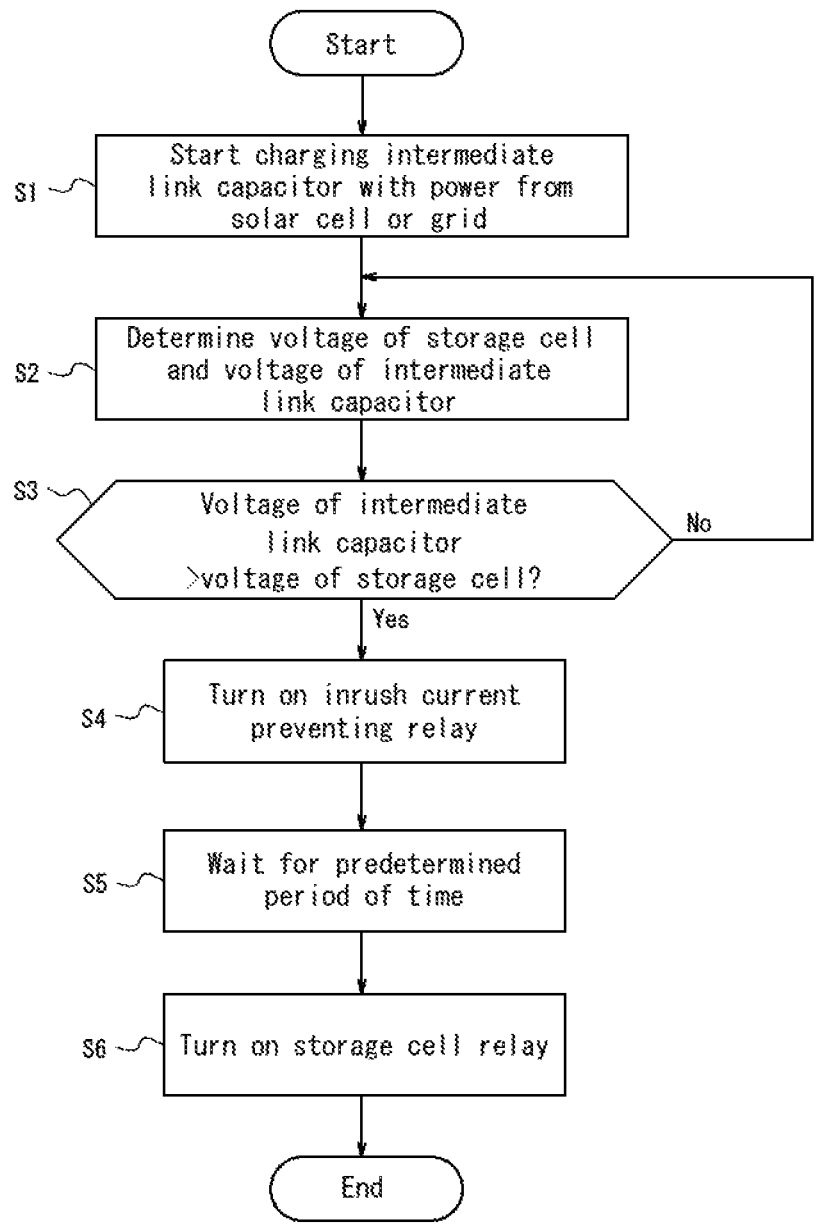
FIG. 2 is a flowchart illustrating a control method according to the first embodiment

A control method of the power supply apparatus 10 will be described with reference to a flowchart illustrated in FIG. 2.

First, the controller 19 turns off the first relay 13, the second relay 14, and the switch 172 and then turns on the switch in the DC/DC converter 11 or the power grid switch. In this way, the controller 19 starts charging the first capacitor 12 with the power from the solar cell 30 or the power grid 50 (step S1).

The controller 19 receives, through the voltage measurement units 41 and 42, the voltage (the second voltage) of the storage cell 20 and the voltage (the first voltage) applied to the first capacitor 12 (step S2).

The controller 19 determines whether the voltage applied to the first capacitor 12 exceeds the voltage of the storage cell 20 (step S3). When determining that the voltage applied to the first capacitor 12 is equal to or lower than the voltage of the storage cell 20 (No at step S3), the controller 19 returns to step S2. On the other hand, when determining that the voltage applied to the first capacitor 12 exceeds the voltage of the storage cell 20 (Yes at step S3), the controller 19 proceeds to step S4. In place of the steps S2 and S3, alternatively, the controller 19 may preliminarily store information about time taken to charge the first capacitor 12 until the voltage applied to the first capacitor 12 exceeds the voltage of the storage cell 20, consider that after the time has lapsed the voltage applied to the first capacitor 12 exceeds the voltage of the storage cell 20, and then proceed to step S4.

Then, the controller 19 turns the second relay 14 on (step S4) such that the storage cell 20 is electrically connected, through the resistor 15, with the second capacitor 16 and the first capacitor 12. Thus, the second capacitor 16 starts charging the power from the storage cell 20.

The controller 19 waits for a predetermined time preliminarily stored (step S5) and, after the predetermined time, turns the first relay 13 on (step S6), i.e., electrically connects the storage cell 20 with the second capacitor 16 and the first capacitor 12, skipping the resistor 15. Alternatively, instead of waiting for the predetermined time at step S5, a voltage measurement unit may be connected in parallel with the second capacitor 16 at either side of the second capacitor 16 to measure the voltage applied to the second capacitor 16 and notify the voltage to the controller 19. In this way, the controller 19 may wait until the voltage applied to the second capacitor 16 becomes equal to or over the predetermined voltage preliminarily stored.

According to the present embodiment, as described above, prior to the electrical connection of the storage cell 20, the controller 19 charges the first capacitor 12 with the power from the solar cell 30 or the power grid 50. Also, when the voltage applied to the first capacitor 12 exceeds the voltage of the storage cell 20, the controller 19 electrically connects the storage cell 20 through the resistor 15. This eliminates the necessity to charge the first capacitor 12 using the storage cell 20, thus reducing the occurrence of the inrush current upon electrical connection of the storage cell 20 and enabling immediate use.

According to the present embodiment, also, when there is power outage during nighttime, the first capacitor 12 cannot be charged with the power from the solar cell 30 or the power grid 50. In this case, the controller 19 turns the first relay 13 off and then turns the second relay 14 on such that the second capacitor 16 and the first capacitor 12 are charged with the power from the storage cell 20 and, after the predetermined period of time, turns the first relay 13 on. In this way, when the solar cell 30 and the power grid 50 cannot supply power, the occurrence of the inrush current upon electrical connection of the storage cell 20 may be reduced.

Second Embodiment

Figure 3:
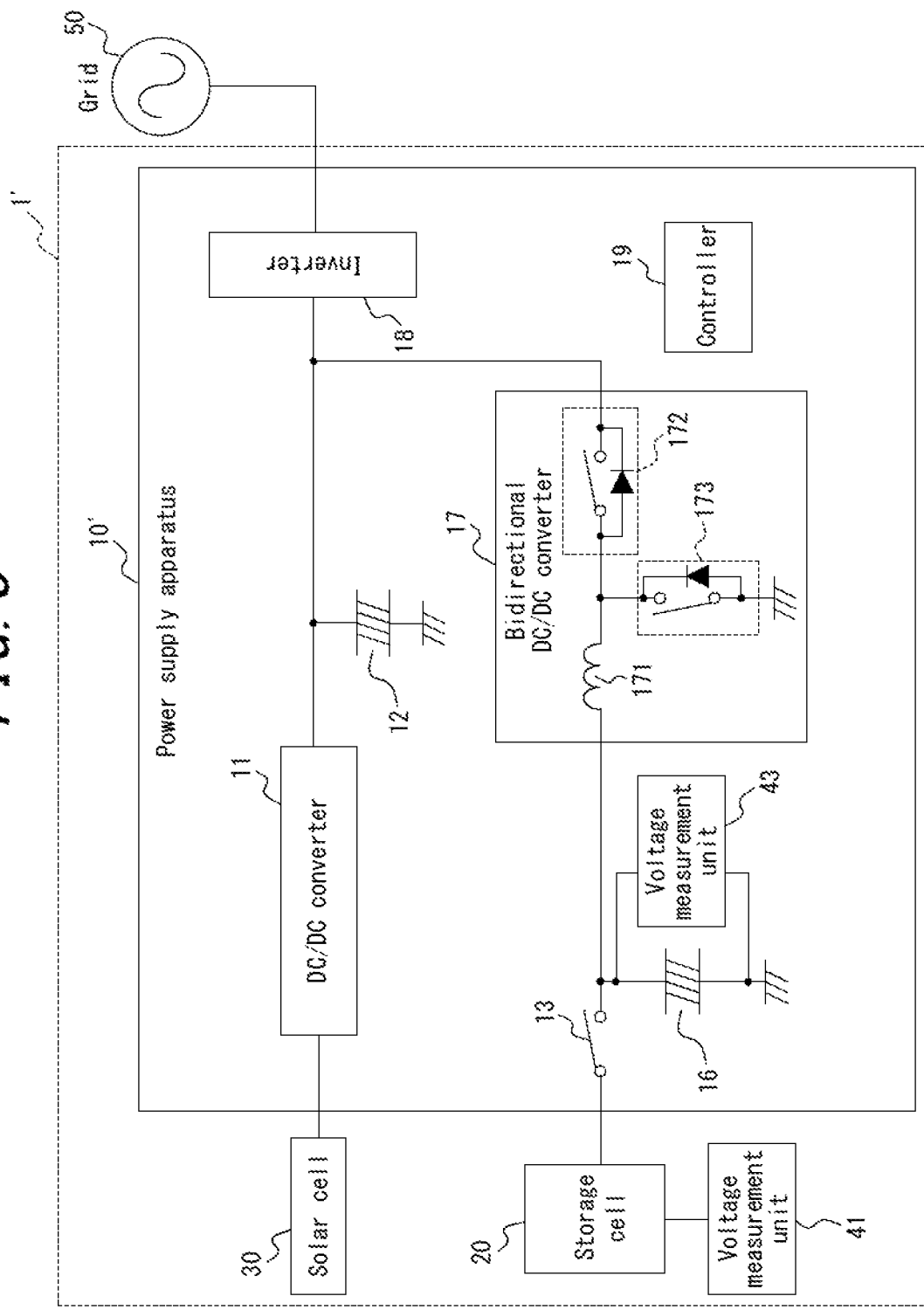
FIG. 3 is block diagram of a power supply system according to a second embodiment.

A power supply system 1' according to a second embodiment includes, as illustrated in FIG. 3, a power supply apparatus 10', the storage cell 20, and the solar cell 30. Here, because the storage cell 20 and the solar cell 30 are identical to those of the power supply system 1 according to the first embodiment, descriptions thereof will be omitted.

The power supply apparatus 10' converts the DC power supplied from the solar cell 30 and the storage cell 20 and the AC power supplied from the power grid 50. The power supply apparatus 10' includes the DC/DC converter 11, the first capacitor 12, the first relay 13, the second capacitor 16, the bidirectional DC/DC converter 17, the inverter 18, and the controller 19. Here, descriptions of elements of the power supply apparatus 10' corresponding to those of the power supply apparatus 10 according to the first embodiment will be omitted. In the power supply apparatus 10', a voltage measurement unit 43 is connected in parallel with the second capacitor 16 at either side of the second capacitor 16 and configured to detect a voltage (a third voltage) applied to the second capacitor 16. The voltage of the second capacitor 16 detected in this manner is notified to the controller 19.

A control method of the power supply apparatus 10' will be described with reference to a flowchart illustrated in FIG. 4.

First, the controller 19 turns the first relay 13 off and turns on the switch in the DC/DC converter 11 or the power grid switch, and then turns the switch 172 on (step S11). Thus, the first capacitor 12 and the second capacitor 16 start charging with the power from the solar cell 30 or the power grid 50 (step S12).

The controller 19 receives the voltage of the storage cell 20 and the voltage applied to the second capacitor 16 from the voltage measurement unit 41 and the voltage measurement unit 43, respectively (step S13).

The controller 19 determines whether the voltage applied to the second capacitor 16 exceeds the voltage of the storage cell 20 (step S14). When determining that the voltage applied to the second capacitor 16 is not equal to the voltage of the storage cell 20 (No at step S14), the controller 19 returns to step S13. On the other hand, when determining that the voltage applied to the second capacitor 16 is equal to the voltage of the storage cell 20 (Yes at step S14), the controller 19 proceeds to step S15. Here, to be determined as equal to each other, these voltages do not need to be exactly the same. However, the closer these voltages are to each other, the better. Preferably, to prevent the voltage applied to the second capacitor 16 from exceeding the voltage of the storage cell 20, procedures at step S13 and S14 are repeated frequently.

Then, the controller 19 turns the first relay 13 on (step S15), i.e., electrically connects the storage cell 20 with the second capacitor 16 and the first capacitor 12.

According to the present embodiment, as described above, the controller 19 simultaneously charges the second capacitor 16 and the first capacitor 12 with the power from the solar cell 30 or the power grid 50. Also, the controller 19 electrically connects the storage cell 20 when the voltage applied to the second capacitor 16 becomes equal to the voltage of the storage cell 20. Therefore, without the second relay 14 and the resistor 15, the occurrence of the inrush current upon electrical connection of the storage cell 20 is reduced, enabling immediate use.

Although the disclosure has been described based on the figures and the embodiments, it is to be understood that various modifications and changes may be implemented based on the disclosure by those who are ordinarily skilled in the art. Accordingly, such modifications and changes are included in the scope of the disclosure. For example, functions and the like included in each element, step and the like may be rearranged without logical inconsistency, so as to combine a plurality of elements or steps together or to separate them.

Many aspects of the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), an electronic notepad, a laptop computer, and other programmable data processing apparatuses. Note that in each embodiment the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module or the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a controller, a microcontroller, an electronic apparatus, and other apparatuses designed to be capable of executing the functions described herein, and/or a combination thereof. The embodiments presented herein are implemented by, for example, hardware, software, firmware, middleware, a microcode, or any combination thereof.

Also, a machine-readable non-transitory storage medium used herein may be constituted by using a solid state memory or a tangible carrier (medium) readable by the computer such as a magnetic disk and an optical disk, and stores an appropriate set of computer instructions such as program modules and a data structure those for making the processor to execute the technique disclosed herein. The computer-readable medium includes an electric connection with at least one wiring, a magnetic disk storage media, other magnetic and optical storage devices (e.g., a CD (Compact Disk), a DVD (Digital Versatile Disc), and a Blu-ray disc), a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided internal/external to the processor/processing unit. Here, the term "memory" means all types of a long-term memory, a short-term memory, a volatile memory, a non-volatile memory, and other memories. A type of the memory, the number of memories, and a type of the medium to store the information are not limited.

REFERENCE SIGNS LIST 1, 1' power supply system
10, 10' power supply apparatus
11 DC/DC converter
12 first capacitor
13 first relay
14 second relay
15 resistor
16 second capacitor
17 bidirectional DC/DC converter
18 inverter
19 controller
20 storage cell
30 solar cell
41, 42, 43 voltage measurement unit
50 power grid
100 power supply apparatus
171 DC reactor
172, 173 switch

The invention claimed is:

1. A power supply apparatus, configured to convert DC power from a solar cell and a storage cell into AC power, and comprising:
   a first capacitor having a first end and a second end, the first end of the first capacitor being connected to ground, the second end of the first capacitor being electrically connected to the solar cell and the storage cell;
   a second capacitor having a first end and a second end, the first end of the second capacitor being connected to ground, the second end of the second capacitor being electrically connected to the storage cell and the first capacitor;
   a controller configured to charge the first capacitor and the second capacitor with the power from the solar cell or a power grid and, if voltage of the second capacitor becomes equal to voltage of the storage cell, to electrically connect the storage cell with the first capacitor and the second capacitor.

2. The power supply apparatus according to claim 1, further comprising a first relay disposed between the second capacitor and the storage cell, and configured to open and close an electric path between the first capacitor and the second capacitor, wherein the controller, if the voltage of the second capacitor becomes equal to the voltage of the storage cell, closes the first relay.

3. The power supply apparatus according to claim 2, further comprising a second relay and a resistor that are connected in series with each other and are connected in parallel with the first relay, disposed between the storage cell and the second capacitor, wherein the resistor is configured to reduce an inrush current, wherein the controller closes the second relay and, after a predetermined period of time, closes the first relay.

4. A power supply system comprising:
   a power supply apparatus configured to convert DC power from a solar cell and a storage cell into AC power;
   a storage cell; and
   a solar cell,
   wherein the power supply apparatus includes a first capacitor having a first end and a second end, the first end of the first capacitor being connected to ground, the second end of the first capacitor being electrically connected to the solar cell and the storage cell, a second capacitor having a first end and a second end, the first end of the second capacitor being connected to ground, the second end of the second capacitor being electrically connected to the storage cell and the first capacitor, and a controller configured to charge the first capacitor and the second capacitor with the power from the solar cell or a power grid and, if voltage of the second capacitor becomes equal to voltage of the storage cell, to electrically connect the storage cell with the first capacitor and the second capacitor.

5. A control method of a power supply apparatus comprising:
   charging a first capacitor and a second capacitor with a power from a solar cell or a power grid, the first capacitor having a first end and a second end, the first end of the first capacitor being connected to ground, the second end of the first capacitor being electrically connected to the solar cell and a storage cell, and the second capacitor having a first end and a second end, the first end of the second capacitor being connected to ground, the second end of the second capacitor being electrically connected to the storage cell and the first capacitor; and electrically connecting, if voltage of the second capacitor becomes equal to voltage of the storage cell, the storage cell with the first capacitor and the second capacitor.

6. The control method according to claim 5 comprising closing a first relay which is disposed between the second capacitor and the storage cell, and configured to open and close an electric path between the first capacitor and the second capacitor, if the voltage of the second capacitor becomes equal to the voltage of the storage cell.

7. The control method according to claim 6 comprising closing a second relay and, after a predetermined period of time, closing the first relay, the second relay and a resistor being connected in series with each other, being connected in parallel with the first relay, and being disposed between the storage cell and the second capacitor, wherein the resistor is configured to reduce an inrush current.

* * * * *